(12) United States Patent
Suresh et al.

(10) Patent No.: US 7,831,595 B2
(45) Date of Patent: Nov. 9, 2010

(54) PREDICTING AND RANKING SEARCH QUERY RESULTS

(75) Inventors: Bipin Suresh, Bangalore Karnataka (IN); Nikhil Garg, Delhi (IN)

(73) Assignee: Yahoo! Inc., Sunnyvale, CA (US)

( * ) Notice: Subject to any disclaimer, the term of this patent is extended or adjusted under 35 U.S.C. 154(b) by 331 days.

(21) Appl. No.: 11/967,851

(22) Filed: Dec. 31, 2007

(65) Prior Publication Data

US 2009/0171942 A1  Jul. 2, 2009

(51) Int. Cl.
  *G06F 17/30* (2006.01)
(52) U.S. Cl. .................. 707/721; 707/722; 707/735; 707/758; 707/780
(58) Field of Classification Search ............... 707/103, 707/721
  See application file for complete search history.

(56) References Cited

U.S. PATENT DOCUMENTS

| | | | | |
|---|---|---|---|---|
| 6,078,916 A * | 6/2000 | Culliss | ................ | 1/1 |
| 6,272,507 B1 * | 8/2001 | Pirolli et al. | ................ | 715/206 |
| 6,574,622 B1 * | 6/2003 | Miyauchi et al. | ................ | 1/1 |
| 6,665,656 B1 * | 12/2003 | Carter | ................ | 707/748 |
| 7,640,236 B1 * | 12/2009 | Pogue | ................ | 1/1 |
| 7,676,517 B2 * | 3/2010 | Hurst-Hiller et al. | ........ | 707/713 |
| 2006/0106769 A1 * | 5/2006 | Gibbs | ................ | 707/3 |
| 2007/0088686 A1 * | 4/2007 | Hurst-Hiller et al. | .......... | 707/4 |
| 2007/0100797 A1 * | 5/2007 | Thun et al. | ................ | 707/3 |
| 2007/0143262 A1 * | 6/2007 | Kasperski | ................ | 707/3 |
| 2008/0109401 A1 * | 5/2008 | Sareen et al. | ................ | 707/3 |

* cited by examiner

*Primary Examiner*—Don Wong
*Assistant Examiner*—Binh V Ho
(74) *Attorney, Agent, or Firm*—Hickman Palermo Truong & Becker LLP; Shane T. Lunceford (57) ABSTRACT

Techniques are described herein for providing search results that are ranked based on a predictor that predicts, for each of a number of objects, likelihoods that each particular object will be selected at different positions on a results list.

20 Claims, 5 Drawing Sheets

PREDICTING AND RANKING SEARCH QUERY RESULTS

FIELD OF THE INVENTION

The present invention relates to search engines, and more particularly, to image, video, and multimedia search engines.

BACKGROUND

A search engine is software that searches a variety of objects in order to find objects that match a particular search query. Examples of the objects include, but are not limited to, web pages, images, video, and other information.

As search engines become more integrated with other applications, the reliability and relevance of the information returned by the search engine gains importance. For example, Yahoo! Local allows a user to search directory listings for local information about goods, services, and entertainment in the user's local area or another area designated by the user. The results of such a search include a map with the locations of the results, as well as ratings about a particular business and other relevant information.

Search engines use many methods of determining the relevance, to a search query, of the objects being searched. One method of determining relevance is to create an index of the text associated with an object. For example, a web page typically consists of a document that contains text and references to other objects such as images and multimedia files. These references cause the images and multimedia files to be displayed as part of a single web page. A "spider," which finds and indexes web pages and objects, may create a copy of the text portion of the web page. In such a system, a search query received by the search engine may contain words that exist in the indexed web page. The user is then provided a means to navigate to the particular web page, as well as other relevant web pages.

Although some multimedia files are capable of being searched for text within the files, reliability of search results is often based on the text in proximity to an object. For example, an image within a web page may be surrounded by text when displayed to a user. This text often describes the image, so an indexing program such as a spider may index the image in a database, along with text that is considered to meet a threshold of association with the image in the web page.

While a minimum level of relevance is determined by matching words, other indicators often assist in creating a ranking score used to sort objects that match a search query. One such indicator may be the historical number of times users have chosen a particular object when the object was displayed in response to a particular search query. Other factors may be the frequency of particular key words in a document, the location of key words in a document, and the number of outside references (such as links) to the document. In some cases, the location of key words within the text of an outside link to the document may influence the weight given to a particular document for a particular query. As the ranking score for a particular object changes, the order in which the object is returned in response to a search query changes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Typically, when searching for information or objects that match a search query, users expect objects that are most relevant to the search query to be displayed at the beginning of a list that is returned in response to the search query ("results list"). The objects may be images, but this is not required. In some cases, a popularity ranking of objects determines the most relevant results. For example, if a majority of users that search for images matching the search query "fish" select a particular image from the web page received in response to the search query, then that particular image will receive a ranking based on its popularity with users searching for "fish." In order to convert popularity into a metric for determining the most relevant results, the influence of the position at which an object was listed is taken into consideration, in accordance with an embodiment of the present invention. Since objects listed at higher positions on the results list may be expected to receive more selections (such as "clicks"), the popularity may be normalized by comparing some measure of the actual number of selections received for a particular object at a particular position to the expected number of selections for an arbitrary object at the particular position.

When the number of actual selections an object receives at a particular position on the results list exceeds the number of selections an object is expected to receive if placed at the particular position, it is said to "overperform" the particular position. Likewise, an object that receives less than the expected number of selections at a particular position is said to "underperform" the particular position.

Techniques are described herein for providing search results that are ranked based on a predictor that predicts, for each of a number of objects, likelihoods that each particular object will be selected at different positions on a results list. Predicting the likelihood that an object, such as an image or video, will be selected (by "clicking" on the object, for example) assists in ranking the object. The likelihood of selection of an object provides an indication of the user's opinion of the quality of the object with respect to a particular query.

In one embodiment, the predictor is based at least in part on selections such as those found in a historical log. The performance of a particular object in the past gives an indication of the probable performance of the object in the future. For example, the log may contain data that indicates how many times each object was selected by users when a results list for a particular search query was provided to the users. More particularly, for each object, the data may indicate the number of times that the particular object was selected when the object was ranked at one or more particular positions on the results list. This information is particularly indicative of object relevance to a particular query in cases where the objects returned are graphical in nature, such as image and video objects. This is because an opinion of relevance to the query is determined by the user before selecting the object.

Based at least in part on the data in a historical log, a prediction is made as to how many times the particular object would be selected if the particular object had been ranked in other positions on the result list for the search query. Predictions are also made for how other objects would perform (e.g., be selected) at positions other than those for which data is available. Then, the objects are ranked based, at least in part, on these predictions.

In one embodiment, ranking is performed based on permutations representing orderings of objects. A permutation is an ordered list. For a set of objects, there exists a finite number of ways to order the objects. For each permutation, a determination is made of the number of selections that are expected to result if a results list is provided in response to queries for objects that match a search query. For example, if objects are listed in order (1,2,3,4,5), then it might be determined, based on the predictor results for each object at each position, that 10 selections are expected to occur over a period of time. If a different ordering, (2,3,1,5,4) for example, is expected to bring a larger number of selections, then the second ordering is more desirable. In this embodiment, all permutations are compared against one another to determine the permutation that is expected to receive the largest number of selections.

In one embodiment, ranking is performed based on a contention game. A predictor determines a number of selections that each object is expected to receive at each position on a results list. The object expected to receive the maximum number of selections at a particular position is placed at the particular position. This determination may be made for each position, with each object competing for each position on the list. This ensures that each position contains the object expected to earn the maximum number of selections for that position.

The search request and result may pertain to any data in any available format. For example, the data may comprise images, video, word processing documents, computer code, or plain text.

Structural Overview

Figure 1:
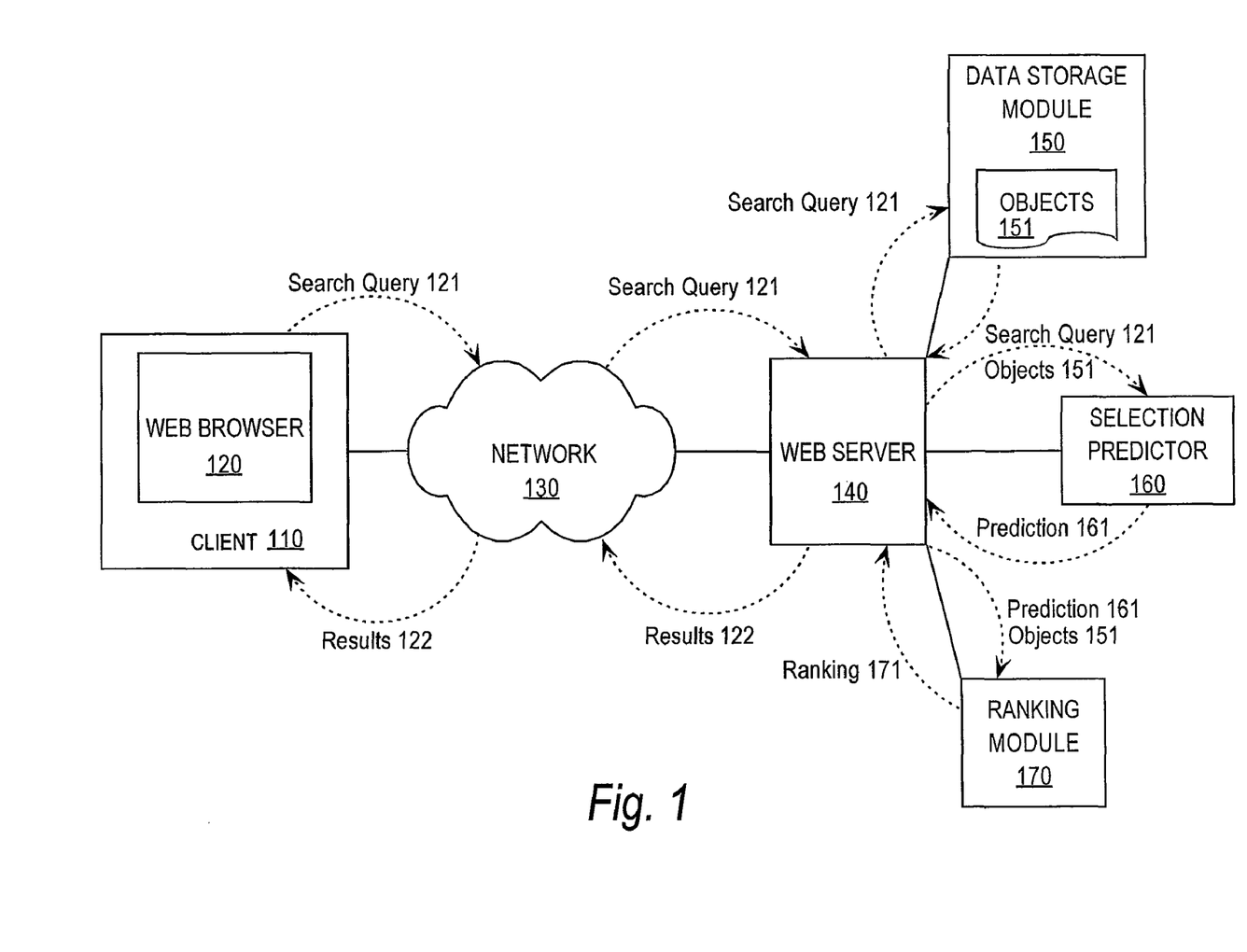
FIG. 1 is a block diagram illustrating an example of a system on which an embodiment of the invention may be implemented.

In one embodiment, a client 110 containing a web browser 120 connects to a web server 140 via a network 130. Client 110 then sends a search query 121 to web server 140 in an attempt to retrieve a list of objects 151, such as images, relevant to search query 121. Web server 140, receiving search query 121, contains software which allows interaction with a data storage module 150 containing objects 151. In one embodiment, data storage module 150 is a database server. Web server 140 forwards search query 121 to data storage module 150 in a format understood by data storage module 150. Data storage module 150 then returns a list of objects 151 matching search query 121.

Once web server 140 has a list of objects 151 that match (i.e., are determined to be relevant to) search query 121, web server 140 in this embodiment passes list of objects 151, along with search query 121, to a predictor 160. Predictor 160 may determine a number of selections expected for each object 151 at each position on a list that is provided in response to search query 121. For example, through web browser 120, a user may submit, to web server 140, a request for images that match (i.e., are relevant to) search query 121. Web server 140 communicates a portion of the resulting list to web browser 120 in the form of a web page. The web page provides a visual list of images, and may include thumbnail (smaller) versions of each image represented in the list. In alternative embodiments, predictor 160 determines other expected results, such as the percentage of overall expected selections that an object 151 is expected to receive. Predictor 160 may then forward these expected results, in the form of a prediction 161, to web server 140.

Before web server 140 sends results to requesting client 110, a ranking module 170 may rank and order the results based on prediction 161. In one embodiment, ranking module 170 determines, based on prediction 161 from predictor 160, a ranking order 171 of objects 151. Ranking module 170 then sends ranking order 171 to web server 140. In one embodiment, ranking module 170 (or some other mechanism) may determine a ranking for a particular query before client 110 issues a query.

After receiving ranking order 171 of objects 151 from ranking module 170, web server 140 may format the data (in the form of a web page, for example) and send results 122 (e.g. within a results web page) to requesting client 110 over network 130. Client 110 may pass results 122 along to web browser 120 in order to allow web browser 120 to display results 122 to the user.

Functional Overview

Figure 2:
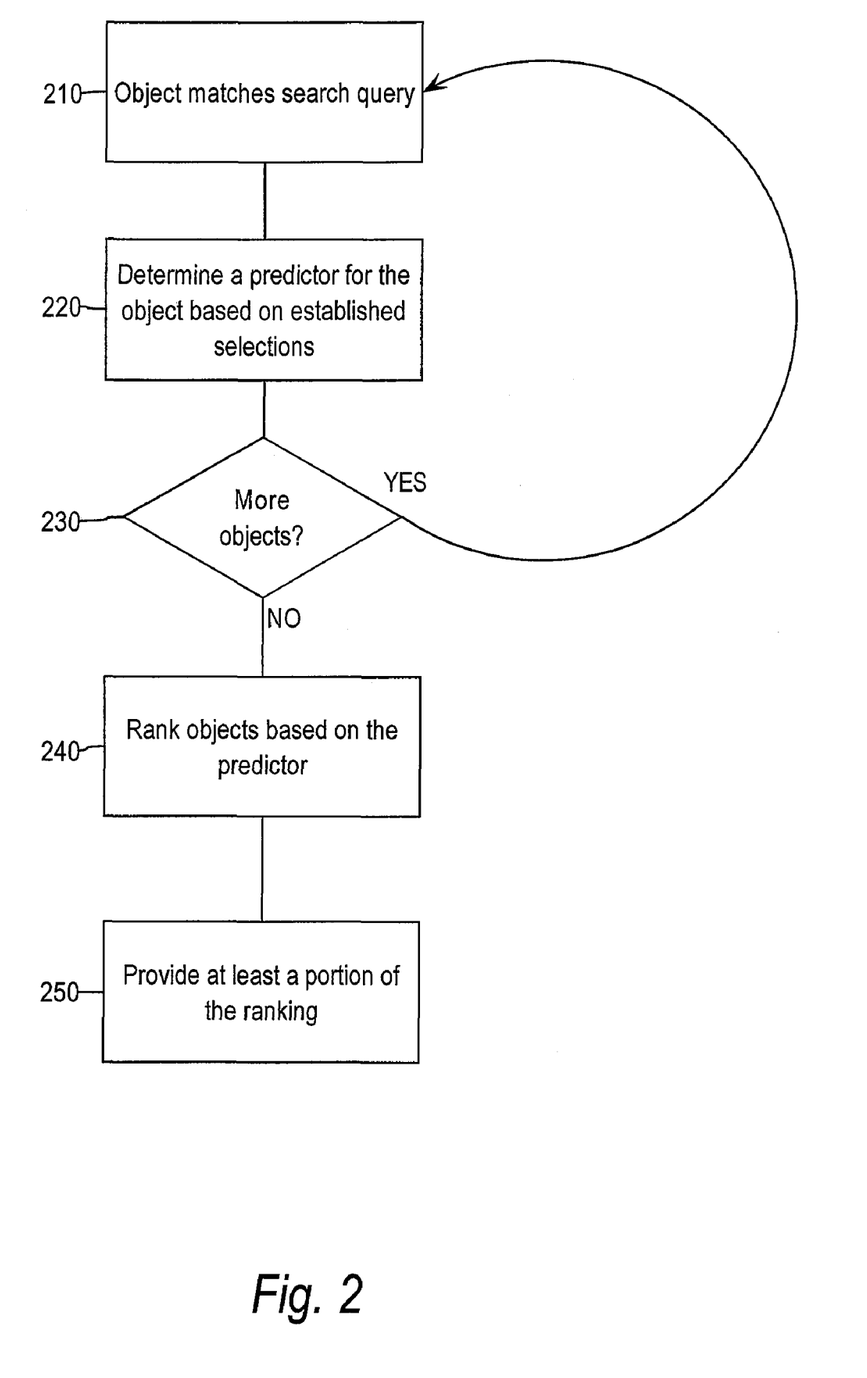
FIG. 2 is a flow diagram that illustrates an example of a technique for ranking objects based on a predictor.

FIG. 2 illustrates a process 200 of providing a ranking for objects 151, in accordance with an embodiment of the present invention. In step 210, an object 151 that matches a search query 121 is determined. Search query 121 may be in any format. In one embodiment, object 151 is an image. One way of determining whether an image matches a search query 121 is by comparing metadata (e.g., text) associated with the image to search query 121. However, other techniques can be used to determine whether an image matches search query 121. Moreover, object 151 is not limited to being an image.

In one embodiment of the invention, at step 220, the system determines a predictor for object 151 based on established selections. In one embodiment of the invention, established selections consist of selections recorded in historical logs. The predictor predicts the likelihood that a particular object 151 will be selected, given a position of object 151 in a potential results list.

If another object 151 matches (i.e., is relevant to) search query 121, the step of determining a predictor is repeated for that object 151 at step 230. A predictor will be determined for each successive object 151. There may be more than one object 151 that matches the search query 121. In such a case, the step of determining a predictor may be repeated for as many objects 151 as the system is configured to require.

Ranking module 170 then ranks the objects 151 based on the predictor at step 240. The predictor provides the basis for the ranking. Because the predictor determines the likelihood that an object 151 will be selected at a particular position, any method of ranking that uses this information from the predictor may be used. For example, in one embodiment of the invention, ranking module 170 may rank objects 151 in such a way that a group of objects 151 most likely to be selected alternate at each of the first ten positions on a list.

At step 250, web server 140 provides at least a portion of the ranking. In an embodiment of the invention, web server 140 provides the ranking in the form of a web page that includes representations of objects 151, such as thumbnails of images or other metadata associated with objects 151, listed in an order that is in accordance with the ranking determination given at step 240.

Figure 3:
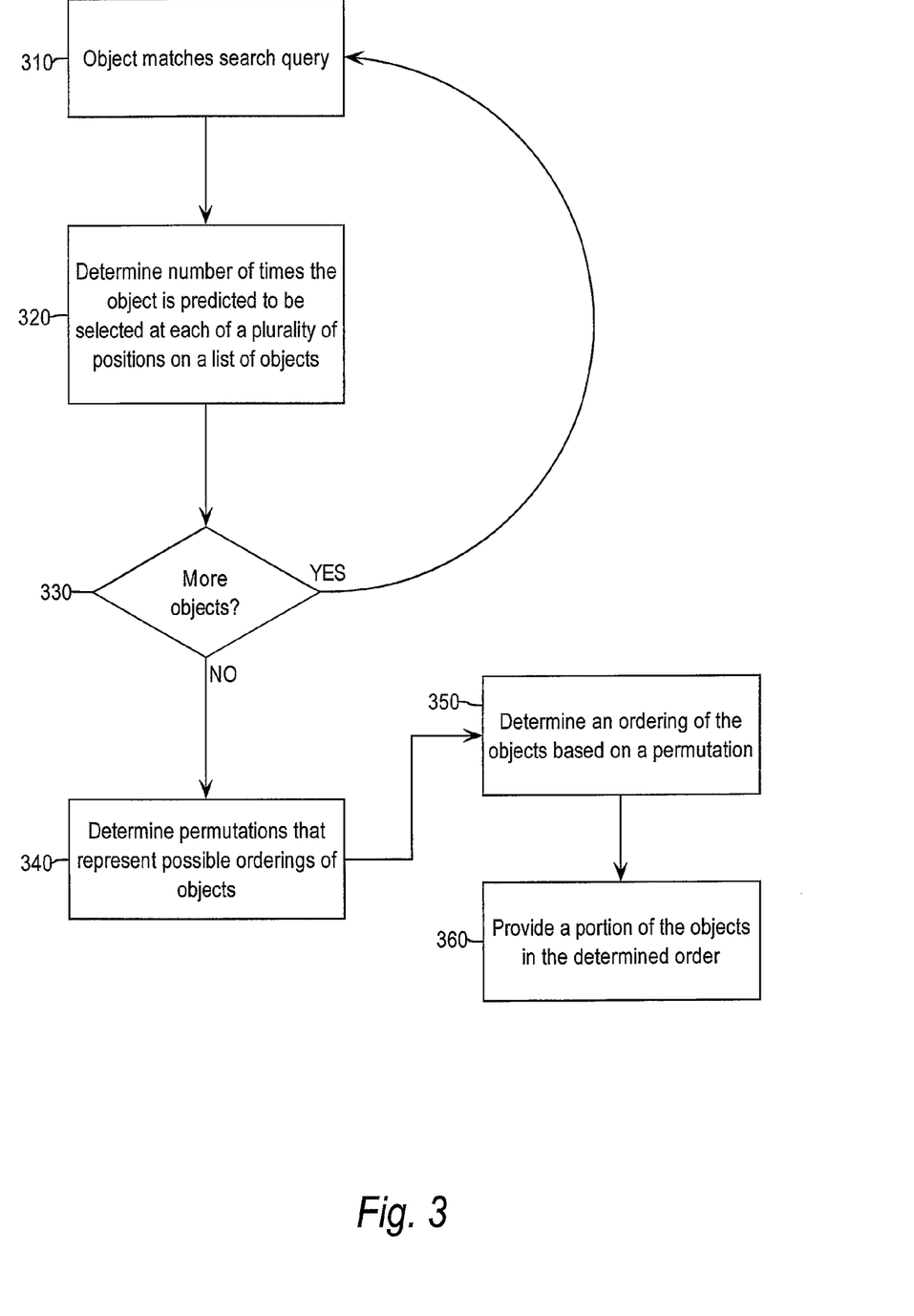
FIG. 3 is a flow diagram that illustrates an example of a technique for ranking objects based on the overall selections expected.

FIG. 3 is a flow diagram that illustrates an example of a technique for ranking objects based on the overall selections expected, according to an embodiment of the invention. In block 310, an object matches a search query. In block 320, for each position of a plurality of positions in a list of search results, a determination is made as to the number of times that the object is predicted to be selected if that object were to be placed that that position in the list of search results. In block 330, a determination is made as to whether there are any more objects that match the search query. If at least one more object matches the search query, then control passes back to block 310. Otherwise, if no further objects match the search query, then control passes to block 340.

In block 340, permutations that represent possible orderings of objects are determined. In block 350, an ordering of the objects is determined based on one of the permutations. In block 360, at least a portion of the set of objects is provided (e.g., within a web page, to web browser 120) in the determined order.

Figure 4:
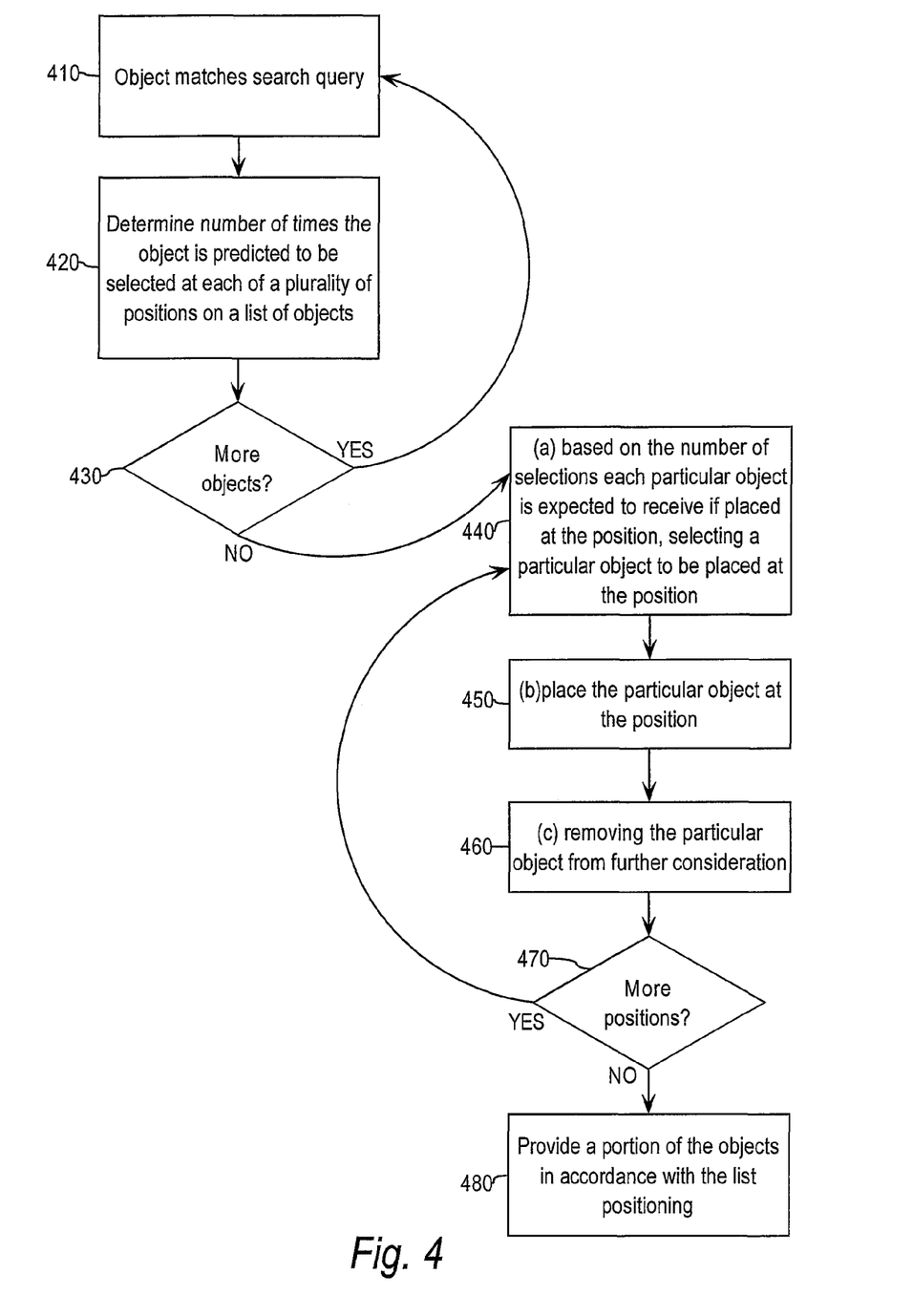
FIG. 4 is a flow diagram that illustrates an example of a technique for ranking objects based on the expected number of selections for each position in a list.

FIG. 4 is a flow diagram that illustrates an example of a technique for ranking objects based on the expected number of selections for each position in a list, according to an embodiment of the invention. In block 410, an object matches a search query. In block 420, for each position of a plurality of positions in a list of search results, a determination is made as to the number of times that the object is predicted to be selected if that object were to be placed that that position in the list of search results. In block 430, a determination is made as to whether there are any more objects that match the search query. If at least one more object matches the search query, then control passes back to block 410. Otherwise, if no further objects match the search query, then control passes to block 440.

In one embodiment of the invention, the operations of blocks 440-470 are performed for each particular object in the set of objects that matches the search query. In block 440, a particular object of the set of objects that match the search query is selected to be placed at a particular position in a list of search results. The particular object is selected based at least in part on the number of selections that the particular object is expected (e.g., based on historical selection statistics) to receive if the particular object were to be placed at the particular position. In block 450, the particular object is placed at the particular position in the list. In block 460, the particular object is removed from consideration in determining positions of other objects in the set of object that match the search query. In block 470, a determination is made as to whether any positions in the list remain unfilled. If at least one position in the list remains unfilled, then control passes back to block 440. Otherwise, if all of the positions in the list have been filled, then control passes to block 480.

In block 480, at least a portion of the set of objects is provided (e.g., within a web page, to web browser 120) in accordance with the positions determined for the objects in the set.

The Predictor

Expected Selections

In one embodiment of the invention, predictor 160 determines the likelihood that an object 151 will be selected if object 151 were to be placed at a particular position on a list of results 122 returned in response to search query 121. Although predictor 160 may determine a raw number of selections, predictor 160 also may determine other useful information. One example of such other useful information is a metric that describes the expected performance (e.g., in attracting user selections) of an object 151 at a given position in a ranked list to be displayed within a search results web page. To assist in determining the performance at a given position, certain embodiments of the invention assign an expected percentage of selections to a particular position in a potential ranked list.

An object 151 in a list returned in response to a search query 121 tends to receive a number of selections (or "clicks") based on the position that the object occupies in the list. Typically, lower objects 151 in list of objects 122 are expected to receive a smaller percentage of selections. For example, under one set of circumstances, the percentage of selections that any object 151 is expected to receive if placed at a particular position might be represented by the following list:

TABLE 1

| Position | Expected Selections (%) |
|---|---|
| Position 1 | 10% |
| Position 2 | 8% |
| Position 3 | 7% |
| Position 4 | 6% |
| Position 5 | 5.5% |
| Position 6 | 5% |
| Position 7 | 4% |
| Position 8 | 3.5% |
| Position 9 | 3% |
| Position 10 | 2% |

Under the circumstances assumed in the foregoing example, using the example list of expected selections in Table 1, in any given search query 121, the object 151 occupying position 1 is "expected" to receive 10% of the selections that occur as a result of that particular list being displayed. The number of expected selections for each position may be a variable that changes, or simply a stated value.

Underperformance and Overperformance

The percentage of expected selections assists in determining the level of overperformance and underperformance of an object 151 at a particular position. Overperformance and underperformance are ways of describing a performance metric. If an object 151 is said to overperform, then that object 151 has received more selections at a position than the expected percentage of selections. Likewise, if an object 151 is said to underperform, then that object 151 has not received the expected percentage of selections.

For example, if the expected percentage of selections for any object 151 at position 1 is 10%, and if an object 151 has received 11% of overall selections for that particular query at position 1, then that object 151 is said to have overperformed position 1. By contrast, if the object 151 has received 9% of overall selections for the particular query at position 1, then the object 151 is said to have underperformed position 1.

In one embodiment of the invention, a performance metric is used to quantify the level of overperformance and underperformance. One way to create a metric using the expected level of performance and historical data about the performance is to divide the actual percentage of selections received by the expected percentage of selections received:

$$\text{Performance Metric} = \frac{\%\ of\ Selections\ (actual)}{\%\ of\ Selections\ (expected)}$$

Taking the earlier example of an object 151 receiving 11% of the overall selections, calculating a performance metric would include the operations of dividing 0.11 (11%) by 0.10 (expected selections=10%) for a total of 1.1. The resulting number is a measure of performance and has no specific unit. It is clear from this example technique, however, that any resulting performance metric reached that is greater than 1 shows overperformance, while any number less than one shows underperformance. To complete the example, if the object 151, instead, received 9% of overall selections, but was expected to receive 10% of overall selections (per the expected selections table 1), then the performance metric would be the result of dividing 0.09 by 0.10, for a resulting performance level of 0.9. In such a case, the object 151 has underperformed.

Performance need not be measured by percentages. In fact, using raw numbers of expected selections and actual selections would work as well.

Historical Data

Much of the information used to build a predictor 160 may be gathered from historical data found in logs. Logs are often created automatically by server software in order to gather statistics about use of a particular system. In the context of web-based systems, data about the selection of a particular object 151 may gathered by parsing web server log files, by passing selections through software that does more detailed tracking, or other methods.

Data gathered may include: (a) instances of selections of individual objects 151, (b) the position an object 151 was at when object 151 was selected, (c) an identity of a search query 121 relative to which object 151 was selected in response, (d) time, and/or (e) a history of list ordering. The history of list ordering provides information about the particular ordering of a list, which may change periodically. From this information, a determination about how many times a particular object 151 was selected in response to a particular query may be made.

Also, in one embodiment of the invention, the number of times that an object 151 was selected after a ranking change occurred is determined. If object 151 moves from one position to another, then a determination of how the movement affected the number of times that object 151 was selected may be made.

In one embodiment of the invention, the total number of times that all objects 151 have been selected for a particular search query 121 is determined by analyzing historical logs. In one embodiment of the invention, this information, along with information about the ranking of objects 151 based on search query 121, is combined with the total number of times that a particular object 151 has been selected in response to the same search query 121. This is enough information to provide a historical performance metric. In one embodiment of the invention, the performance metric discussed above is derived by dividing the total number of times that object 151 was selected at a particular position by the total number of times that the particular list was displayed in response to a particular query. Thus, historical underperformance and overperformance may be determined.

Predicting Future Performance

In one embodiment of the invention, history assists in predicting the future selections of objects 151. For example, if objects 151 that overperform position 5 with a performance metric of 2.6 tend to overperform with a metric of 1.3 when moved to position 2, then it is likely that future objects 151 will overperform under the same circumstances.

One method of determining a prediction of performance based on the change in position of an object 151 is to average the performance change over all objects 151 that change from one position to another, independent of the query. As an example, the following table represents the performance metrics of several objects 151 that have changed from position 5 to position 3.

TABLE 2

| Object | Position | Performance | Position | Performance |
|---|---|---|---|---|
| Object 1 | 5 | 2.6 | 3 | 1.6 |
| Object 2 | 5 | 2.6 | 3 | .9 |
| Object 3 | 5 | 2.6 | 3 | 1.4 |

As is evident from Table 2, the performance change was not the same for each object 151. In one embodiment of the invention, instead of relying on the performance change of any one particular object 151, the average expected performance is predicted. By taking the average of the new performance metric at position 3, a system according to an embodiment of the invention may predict that an object 151 that is at position 5, when moved to position 3, will have a performance metric of:

$$\frac{1.6 + .9 + 1.4}{3} = 1.3$$

As more information is gathered, the prediction for each position and performance change becomes more stable. Further, other techniques for determining the predicted performance given the same information are used in various alternative embodiments of the invention; for example, the mean or the mode may be taken rather than the average. Other techniques used in artificial intelligence applications may also be applied to this information.

Alternative Embodiments

In one embodiment of the invention, the expected percentage of selections is predetermined or specified by a user. However, in an alternative embodiment of the invention, the expected percentage of selections is not predetermined or specified by a user. As more data about the number of selections at each position becomes available, the expected number of selections may change. For example, predictor 160, along with any one of the ranking methods discussed below, may increase the quality of the search results such that a higher number of selections will be expected for objects 151 occupying the first positions on the list of results.

Ranking

Ranking based on a predictor 160 can be done in a variety of ways. A particular goal may make one technique for ranking more attractive than other techniques. Two distinct techniques for ranking are disclosed herein.

Permutation Ranking

In one embodiment, ranking is performed based on permutations representing orderings of objects 151. For a set of objects 151, there exists a finite number of ways to order the objects 151. Each permutation represents one such ordering. Using the predictor 160, a permutation to be used for ranking is determined.

For each permutation, a determination by a predictor function of predictor 160 is made of the number of selections that are expected to result if a results list is provided in response to queries for objects 151 that match search query 121. Predictor 160 predicts the number of user selections that each object 151 will receive if that object were to be placed at a particular position on a list of search results. After the expected number of selections for each object 151 at each position has been predicted, then the result is applied to each permutation to determine the permutation representing the largest number of expected selections.

TABLE 3

|  | Position 1 | Position 2 | Position 3 | Position 4 |
|---|---|---|---|---|
| Object A | 14 | 12 | 10 | 8 |
| Object B | 14 | 13 | 10 | 8 |
| Object C | 15 | 15 | 8 | 6 |
| Object D | 13 | 12 | 5 | 8 |

TABLE 4

| Permutation | Expected Selections | Permutation | Expected Selections |
|---|---|---|---|
| ABCD | 42 | BACD | 42 |
| ABDC | 37 | BADC | 37 |
| ACBD | 46 | BCAD | 47 |
| ACDB | 41 | BCDA | 42 |
| ADBC | 41 | BDAC | 45 |
| ADCB | 41 | BDCA | 42 |
| Permutation | Expected Selections | Permutation | Expected Selections |
| CABD | 45 | DABC | 41 |
| CADB | 40 | DACB | 41 |
| CBAD | 46 | DBAC | 42 |
| CBDA | 41 | DBCA | 42 |
| CDAB | 45 | DCAB | 46 |
| CDBA | 45 | DCBA | 46 |

For illustration purposes, a set of four objects 151 may be assumed. These objects 151 are represented in Table 3 as Object A, Object B, Object C, and Object D. If objects 151 are listed in order (A,B,C,D), it may be determined, based on the predictor 160 for each object 151 at each position given in Table 4, that 42 selections are expected to occur over a period of time. If a different ordering, (B,C,A,D) for example, is expected to bring a larger number of selections, then the second ordering is more desirable. In the example, (B,C,A,D) offers 47 expected selections, the highest number of expected selections of all permutations. In this embodiment, all permutations are compared against one another to determine the permutation that is expected to receive the largest number of selections.

In one embodiment of the invention, permutation ranking is used on the entire set of objects 151 that match a query. However, in an alternative embodiment of the invention, permutation ranking is used on only a partial subset of the objects 151 that match the query. In one embodiment of the invention, the system is configured to require a minimum number of expected selections at a given position threshold in order to allow participation in the permutation ranking. For example, a permutation ranking method may be used for the first 60 positions while a different ranking method is used for the remaining positions in a list returned in response to a search query 121. In such an embodiment, the predictor 160 predicts the number of expected selections for all of the objects 151, but only allows an object 151 to participate in the permutation ranking if a specified minimum number of selections is expected at one or more particular positions. Likewise, a threshold may be set to disqualify an object 151 from participation in the permutation ranking.

Contention Game Ranking

In one embodiment, ranking is performed based on a contention game. The predictor 160 determines a number of selections that each object 151 is expected to receive at each position on a results list, and the object 151 expected to receive the maximum number of selections at a particular position is placed at the particular position.

Each object 151 competes for each position on the list, and is taken out of play when that object is placed. In other words, in one embodiment of the invention, an object 151 will not compete for position 1 and then also compete for position 2. This ensures that each position contains the object 151 expected to earn the maximum number of selections for that position without repeating results that are available at a higher position.

In the example shown in Table 3, Object C is expected to receive the most selections if placed in position 1. If Object C is placed in position 1, then Object C is expected to receive 15 selections over the relevant period. Object B is next, with 13 selections expected at position 2, and then Object A, with 10 selections expected at position 3, and finally Object D, with 8 selections expected at position 4. This result, (C,B,A,D), is different than the result from the permutation ranking of (B,C,A,D). According to Table 4, the contention ranking offers a total of 46 expected selections over the relevant period. While this total is lower than the total number of expected selections using the permutation method, the contention game ensures that each position contains the object 151 considered most likely to be selected at that position.

In one embodiment of the invention, contention ranking is used on the entire set of objects 151 that match a query. However, in an alternative embodiment of the invention, contention ranking is used on only a partial subset of the objects 151 that match the query. The system may be configured to require a minimum number of expected selections at a given position threshold in order to allow participation in the contention ranking. In one embodiment, only objects 151 that have been selected a predetermined number of times participate in the contention game. For example, an object 151 might not be considered in the contention game if that object has not been selected five times in response to a search query 121. Such a rule reduces the number of comparisons required to be made for each position available. Likewise, a threshold may be set to disqualify an object 151 from participation in the contention ranking.

Hardware Overview

Figure 5:
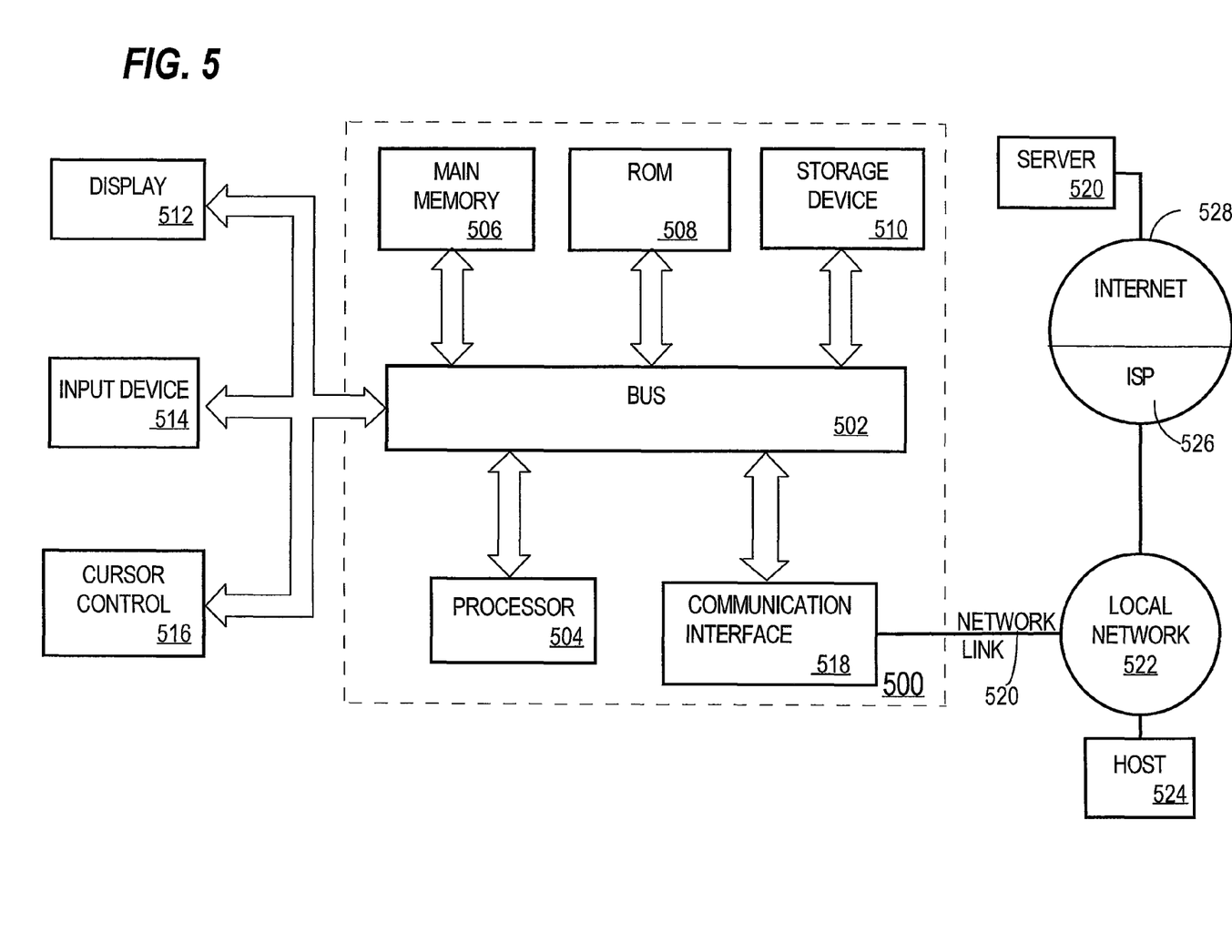
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
for a first object of a plurality of objects that are determined to be relevant to a first search query, determining a first predictor metric based at least in part on previous selections of the first object under circumstances in which the first object was at a first position in one or more first ordered lists of objects generated in response to one or more first search requests based on the first search query;
for a second object of the plurality of objects, determining a second predictor metric based at least in part on previous selections of the second object under circumstances in which the second object was at a second position in the one or more first ordered lists;
wherein each predictor metric reflects a likelihood that the associated object will be selected at one or more positions within second ordered lists of objects that are (a) determined to be relevant to the first search query and (b) ordered differently than said first ordered lists;
generating a ranked list by ranking the plurality of objects based on previous selection-based predictor metrics determined for the first and second objects, wherein the second object is placed at a position higher than the second position in the ranked list, and the first object is placed at a position lower than the first position in the ranked list; and
in response to receiving a second search request based on said first search query from a user, providing at least a portion of the ranked list to said user;
wherein the method is performed by one or more computing devices.

2. The method of claim 1, wherein determining a predictor metric for an object is based at least in part on established selections of the object at at least one position in two or more first ordered lists of objects that match the search query.

3. The method of claim 1, wherein determining a predictor metric for an object is based at least in part on established selections of objects that are not objects that match the first search query.

4. The method of claim 1, wherein at least a portion of the objects that match the first search query represent image files.

5. The method of claim 1, wherein the at least a portion of objects that match the first search query represent video files.

6. A machine-implemented method, comprising:
for each particular object of a plurality of objects that are determined to be relevant to a search query, determining a predictor for the particular object based at least in part on previous selections of the particular object under circumstances in which the particular object was at a particular position in one or more first ordered lists of objects that match the search query,
wherein said predictor reflects a likelihood that the particular object will be selected at various positions within second ordered lists of objects that are (a) determined to be relevant to the search query and (b) ordered differently than said first ordered lists;
generating a ranked list by ranking the plurality of objects based on previous selection-based predictors determined for each object in the plurality of objects; and
in response to receiving said search query from a user, providing at least a portion of the ranked list to said user;
wherein the predictor:
a) determines a performance metric for the particular object at the current position;
b) determines a second position for which to predict performance;
c) determines an expected performance metric based at least in part on historical selections of objects that have:
1) moved to the second position from a previous position that matches the current position of the particular object; and
2) previously had a performance metric matching the performance metric of the particular object;
wherein the method is performed by one or more computing devices.

7. The method of claim 6, wherein determining a performance metric comprises:
dividing the actual percentage of selections by an expected percentage of selections.

8. The method of claim 7, wherein the expected percentage of selections comprises of static data.

9. A computer-implemented method comprising:
determining a plurality of different orderings of a first of search results;
determining, for a first ordering of the plurality of orderings, a selection probability that reflects a probability that search results that are ordered according to the first ordering will be selected by users;
determining, for a second ordering of the plurality of orderings, a selection probability that reflects a probability that search results that are ordered according to the second ordering will be selected by users;
wherein the selection probability for each particular ordering is based on the number of predicted selections for each object in that ordering;
selecting, the first ordering in response to determining that the first ordering is associated with a highest selection probability among the selection probabilities that are associated with the first and second orderings;
wherein the object occupying the highest position in the first ordering is expected to receive less selections than another object at the first position in the second ordering; and
storing the selected ordering on a computer-readable storage medium;
wherein the method is performed by one or more computing devices.

10. The method of claim 9, wherein the selection probability is based at least in part on information concerning numbers of previous selections of the search results under circumstances in which the search results were ordered according to the particular ordering.

11. A volatile or non-volatile non-transitory computer-readable storage medium storing instructions which, when executed by one or more processors, causes the one or more processors to perform the method recited in claim 1.

12. A volatile or non-volatile non-transitory computer-readable storage medium storing instructions which, when executed by one or more processors, causes the one or more processors to perform the method recited in claim 2.

13. A volatile or non-volatile non-transitory computer-readable storage medium storing instructions which, when executed by one or more processors, causes the one or more processors to perform the method recited in claim 3.

14. A volatile or non-volatile non-transitory computer-readable storage medium storing instructions which, when executed by one or more processors, causes the one or more processors to perform the method recited in claim 4.

15. A volatile or non-volatile non-transitory computer-readable storage medium storing instructions which, when executed by one or more processors, causes the one or more processors to perform the method recited in claim 5.

16. A volatile or non-volatile non-transitory computer-readable storage medium storing instructions which, when executed by one or more processors, causes the one or more processors to perform the method recited in claim 6.

17. A volatile or non-volatile non-transitory computer-readable storage medium storing instructions which, when executed by one or more processors, causes the one or more processors to perform the method recited in claim 7.

18. A volatile or non-volatile non-transitory computer-readable storage medium storing instructions which, when executed by one or more processors, causes the one or more processors to perform the method recited in claim 8.

19. A volatile or non-volatile non-transitory computer-readable storage medium storing instructions which, when executed by one or more processors, causes the one or more processors to perform the method recited in claim 9.

20. A volatile or non-volatile non-transitory computer-readable storage medium storing instructions which, when executed by one or more processors, causes the one or more processors to perform the method recited in claim 10.

* * * * *